Dec. 26, 1950 A. RABL 2,535,453
BICYCLE HUB DYNAMO
Filed May 11, 1949 2 Sheets—Sheet 1

Inventor
ALFRED RABL

Attorney

Dec. 26, 1950  A. RABL  2,535,453
BICYCLE HUB DYNAMO
Filed May 11, 1949  2 Sheets-Sheet 2

Inventor
ALFRED RABL
By
Attorney

Patented Dec. 26, 1950

2,535,453

UNITED STATES PATENT OFFICE 2,535,453

BICYCLE HUB DYNAMO

Alfred Rabl, Vienna, Austria

Application May 11, 1949, Serial No. 92,539
In Austria May 13, 1948

13 Claims. (Cl. 171—209)

This invention relates to a bicycle hub dynamo in which the dynamo armature and the driving member are connected by means of a transmission gearing which can be coupled with the bicycle, if required, by means of a switching member and which is adapted to drive the dynamo at an increased speed. The known transmission gearings comprising toothed wheels are not efficient enough and owing to their transmission ratios do not give enough light as required in modern traffic conditions. Neither do bicycle dynamos driven by frictional gearings give a satisfactory output of light, the speed of rotation of the dynamo being too small, especially at low driving speed.

It has been proposed already to improve the output of bicycle hub dynamos by connecting several gearing stages, consisting of axial pressure ball bearings so as to form a transmission gearing, which comprises a single means for applying pressure to all gearing stages and which transmits the rotation of the wheel hub to the dynamo rotor according to the transmission ratio. In known gearing, the rotating and revolving gearing members of all gear stages are accommodated in a casing, which also contains the pressure means, which abuts on the one hand on the casing, on the other hand on the gear members. This method of applying pressure is unsuitable because it is dependent on the casing which encloses the gearing, thus co-utilizing the wheel hub as a gearing member.

This invention is based on the idea of combining the gear members with the pressure means in a unit which enables a positive transmission of forces, so that the whole transmission gearing, together with the dynamo, can be built into and out of the wheel hub in a simple manner and, moreover, utmost efficiency is achieved as regards torque transmission.

Whereas transmission gearings are known in which pressure is positively transmitted similarly as by axial pressure ball bearings, those gearings have a single gear stage only, whose split inner and outer races are subjected to the axial pressure of a spring for providing the frictional pressure required for transmitting the torque.

In contradistinction thereto the problem at hand is solved according to the invention in that the races and the revolving balls of at least one pair of the gear stages of a multi-stage gearing are subjected to pressure in mutually opposite axial directions by a pressure means, and that both said gear stages are held together in two directions opposite to the pressure exercised by said pressure means by an axial thrust bearing common to both said stages, all gear parts of both said gear stages together with the pressure means and the axial thrust bearing thus forming an integral system which is adapted to effect a positive transmission of pressure.

This solution for the first time enables the reduction of a dynamo together with the transmission gearing to a unit of the smallest possible size which can be conveniently built into and out of a normal size wheel hub. Moreover, the new design of the gearing results in a high transmission ratio and thus also in a very high light output of the dynamo.

The means for applying pressure to the gear stages may be developed in many variations, some of which may be mentioned hereafter. The pressure means may consist, e. g., of an elastic tension means, which attacks on the one hand at the input end of the gearing, on the other hand at the races revolving at the output end of the gearing, and which holds together the gear members by axial pressure so as to form an integral system. It is also possible, however, to use the dynamo itself as a pressure means and to utilize the attraction of the stator, which is provided with a winding, for generating the frictional pressure required for the transmission. It is also possible to subject the pressure means to centrifugal force. In multi-stage transmission gearings one portion of the gear, e. g., the input stages, may be subjected to the influence of an elastic pressure means and the other gear stages to that of the dynamo magnet.

The invention provides a gear which is particularly suitable for being built into the wheel hub when the positive transmission of pressure between the gear members, which are subject to the pressure exercised by said pressure means, is afforded by the bearing cone fixed to the wheel axle and holding the whole gearing, which together with the wheel hub is secured against axial displacement but freely rotatable on the wheel axle.

The drawings show, by way of example, several embodiments of a hub dynamo according to the invention, in sectional elevations.

Fig. 1, relating to the first embodiment, shows a three-stage transmission gearing having an elastic pressure means.

Fig. 2 a variation of the design shown in Fig. 1.

Figure 1:
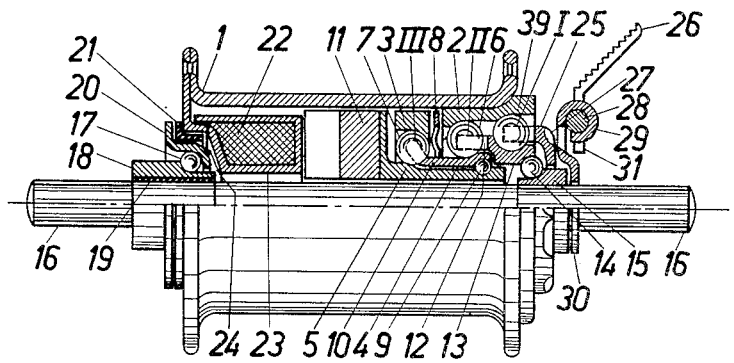

The first embodiment of the bicycle hub dynamo is mounted in the hub casing 1 of the front wheel and consists of the dynamo proper and the transmission gearing. In this case the gearing comprises three speed stages. The gear stages II and III, which are combined in a system that is adapted to effect a positive transmission of forces, have outer races 2 and 3 and inner races 4 and 5, respectively, which races present their tracks to the two ball trains 6 and 7. A spring ring 8 or a pressure element made from rubber is provided between the outer races 2 and 3 and applies elastic pressure, in mutually opposite axial directions, upon the outer races 2 and 3. Said outer races 2, 3 transmit this pressure through the two ball trains 6 and 7 to the inner races 4 and 5. The inner races 4, 5, are freely and rotatably supported in axial opposition relative to each other by means of an axial thrust ball bearing 9, which absorbs the pressure forces acting in mutually opposite directions and thus provides a positive transmission of forces so that the gearing rotates free from axial pressure. The inner race 4 of the gear stage II is integral with the ball cage 10 of the gear stage III. Similarly the inner race 5 of the gear stage III is directly connected with the rotor 11 of the dynamo, the attractive force of the dynamo magnet thus being permanently utilized as an additional pressure force acting on the gear members of the gear stages II and III. The ball cage 12 of the gear stage II is made with the inner race 13 of the gear stage I in one piece, which also has a ball race for the axial ball bearing 14, whose inner race is developed as a nut threadable on the fixed axle pin 16 which forms the wheel axle. The outer race 2 of the gear stage II is integral with the outer race of the gear stage I. The outer race 2 is fitted into the wheel hub and is thus carried along when the latter rotates. The outer race 3 of the last gear stage, being displaceably fitted axially into the wheel hub 1, is carried along with the rotatable outer race 2 by means of the spring ring 8. The outer race 3 is so held in the wheel hub 1 on the one hand by the friction of its fit, on the other by the pressure of the spring 8, that during the transmission of a normal torque it remains undisplaceable relative to the wheel hub 1 and the outer race 2, whereas when the gearing is overloaded, e. g. by reason of gear parts being jammed or as a result of excessive driving power, the outer race 3 is carried along by the ball train 7 rotates relative to the wheel hub 1. The outer race 3 thus serves as a protection means against the blowing out of the bulb owing to excessive voltage and against accidents caused by gearing defects.

Whereas the wheel hub 1 is, together with the transmission gearing, freely rotatably mounted on the fixed wheel axle 16, on the one side by means of the ball bearing 14, the wheel hub is rotatably mounted and secured against axial displacement on the other bearing side by means of the ball bearing 17. In this specific case, said bearing 17 is developed as a current collector. For this purpose the inner race 18 of the ball bearing 17 is mounted on a sleeve 19 of electrically insulating material fitted to the fixed wheel axle 16, and is thus electrically insulated against the axle and may be firmly connected, as a current collector, with the light cable (not shown) in any suitable manner. The outer race 20 of the ball bearing 17 also has a strip 21 of electrically insulating material around its periphery, by which it is electrically insulated against the dynamo magnet comprising the winding 22. The wire end 24 of the winding 22, therefore, may be directly connected with the outer race 20, the need for any complicated means for collecting the current thus being eliminated.

The cage ring 25 of the gearing stage I is utilized for switching the hub dynamo in and out. Said cage ring is mounted so as to be freely rotatable and can be locked to the wheel axle 16 by means of a switching or control lever 26. For this purpose, the cage ring 25 is provided with radial recesses 27 arranged in a circle. The lever 26 is mounted by means of a pivot pin 28 in the eye 29 of a bearing arm 30 which is fixed to the wheel axle, the lever being adapted to pivot within such limits that its short locking arm 31 may be thrown into or out of the recesses 27 of the cage ring 25. When thrown out, the cage ring is disengaged from the switching means or lever 31, 26 and rotates freely and without resistance, the gearing thus being inoperative.

For switching in the hub dynamo, the switching means 26 is thrown into one of the recesses 27 of the cage ring 25, which is thus fixed relative to the wheel axle 16. The balls of the gear stage I thus revolve on the outer race 2 and drive the inner race 13 at an increased speed. This increased speed is transmitted by the inner race 13 to the ball train 6 of the gear stage II, said ball train 6 being subjected to the frictional pressure of the spring ring 8 and to the attractive force of the dynamo magnet and driving the inner race 4 of the gear stage II at a speed which is increased according to the transmission ratio. The transmission of the torque from the gear stage II to the gear stage III is effected by the inner race 4 through the ball cage 10, by which the balls 7, just as in the previous gear stages I and II, are caused to revolve in the same sense of rotation. The ball train 7 transmits its rotation at an increased speed to the inner race 5 and thus to the rotor 11 of the dynamo.

The transmission ratios of said three gear stages are so chosen that the dynamo rotor has, even at low driving speed, a speed of rotation which ensures an electric power output sufficient for giving good light. The gearing members are so formed that their manufacture as well as their assembly and removal may be carried out in the simplest possible manner.

Figure 2:
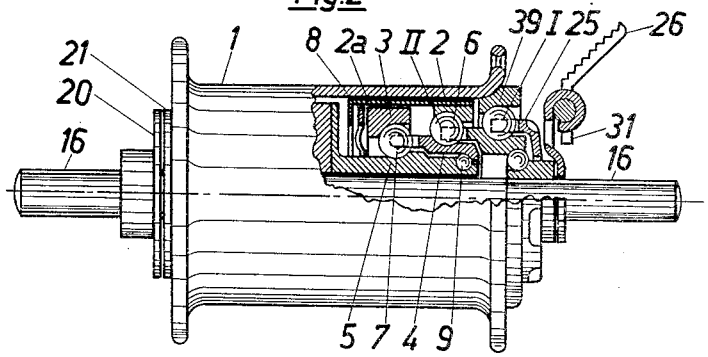

In the second embodiment as shown in Fig. 2, the elastic element is a spring ring 8 arranged behind the outer race 3. For this reason, the outer race 2 of the gear stage II is provided with a sleeve 2a which surrounds and extends beyond the opposite side of the outer race 3, said sleeve terminating in an inturned annular flange against which the spring ring 8 bears. Said spring ring 8 thus tends to elastically press the two outer races 2 and 3 together and to press the ball trains 6 and 7 against the inner races 4 and 5. The inner races 4 and 5 are supported in opposition to each other through the axial thrust ball bearing 9 so that a positive transmission of forces is achieved over the gearing members of the gear stages II and III. The gearing is switched in and out in the manner described heretofore by locking the cage ring 25 by means of the switching means or lever 26.

Figure 3:
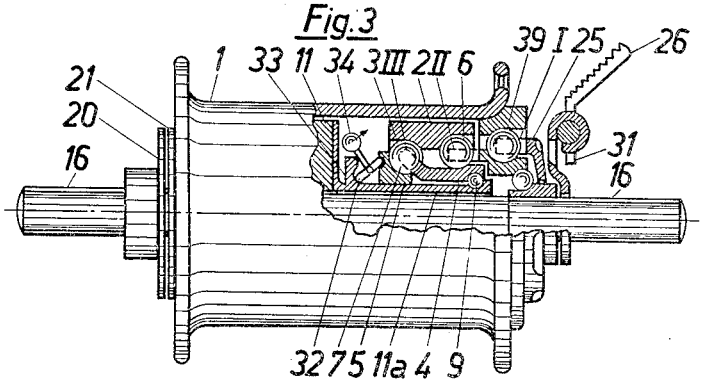
Fig. 3 shows a transmission gearing having a pressure means which is subjected to centrifugal force.
Figure 3:

The embodiment shown in Fig. 3 is an example of a transmission gearing having a pressure means which is subjected to centrifugal force. In this case the pressure means consists of fingers 32 or their equivalents, which bear on the one side against the inner race 5 of the last stage III and on the other against an annular flange 33 of the sleeve 11a connected with the dynamo rotor 11, and are subjected to the influence of lever arms having adjustable centrifugal weights 34 for generating the pressure required. The pressure exercised by the pressure means 32 is on the one hand transmitted through the ball train 7 of the stage III to the outer race 2, and from the latter through the ball train 6 to the inner race 4, and is on the other hand absorbed by the bearing sleeve 11a of the dynamo rotor and transmitted to the axial thrust ball bearing 9, which effects the positive transmission of forces. The pressure exercised on the gearing is thus regulated in accordance with the speed of rotation of the driving part. The outer races may also be provided with fingers 32 in the same manner.

Figure 4:
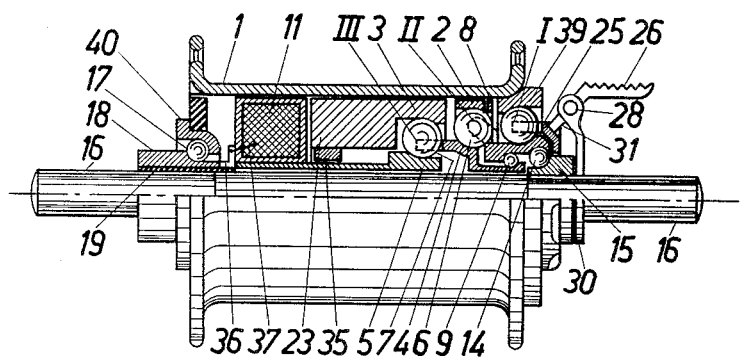
Fig. 4 shows an embodiment in which the gearing is combined with an elastic and a magnetic pressure means.

Fig. 4 shows another embodiment of the transmission gearing. In this case, the three gear stages I, II, and III are subjected to the influence of an elastic pressure means and of a magnet. In this specific case the gear stages I and II are subjected, as in Fig. 1, to the influence of an axially elastic ring 8, whereas the gear stage III consists of an outer race 3 connected with the magnet 23, and of an inner race 5 connected with the dynamo armature 11, the ball train 7 revolving between said races 3 and 5 and being subjected to the attractive force between the two dynamo parts 11 and 23. The dynamo armature 11 is mounted in the magnet 23 so as to be freely rotatable in the wheel hub by means of a bearing 35. A slip ring for the armature 11 is provided by a contact spring 36 which is connected to the armature by a lead 37 and bears against the inner race 18. The contact spring 36 conducts the current to the ball bearing, to whose fixed inner race 18 the lamp lead may be connected. This design is distinguished by its great simplicity and in that the gearing parts form a system in which a complete positive transmission of forces is ensured.

Figure 5:
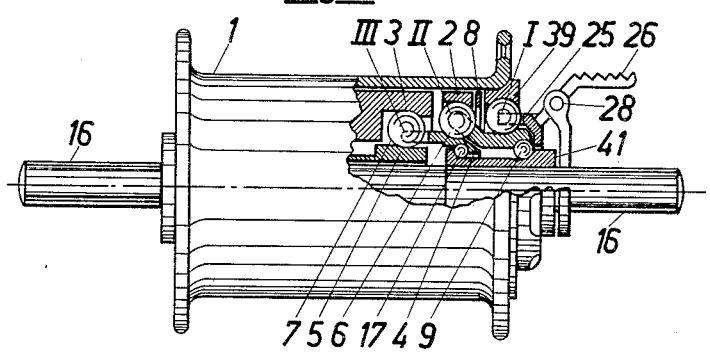
Fig. 5 illustrates a transmission gearing having two bearing supports provided on a bearing cone.

The embodiment shown in Fig. 5 illustrates a special manner of mounting the wheel hub and the gearing on a conical sleeve. For this purpose the outer race and the inner race of the first gear stage are similar to the outer race and inner race of the second gear stage. The pressure means, consisting of a spring ring 8, is inserted between the two outer races of the gear stages I and II, the pressure exercised by said ring being evenly transmitted in both directions through the outer races to the ball trains of the gear stages I and II. Said ball trains bear against the inner races of the two gear stages, which inner races are also made equal to each other and bear in mutually opposite directions against a common bearing cone 41 on which they are freely rotatable. In this case the pressure exercised by the spring ring 8 is absorbed through the two axial thrust ball bearings 9 and 17 by the bearing cone 41 so that a positive transmission of forces through all gear parts of the two gear stages I and II is effected. At the same time the wheel hub 1, which is fitted to the outer race of the first gear stage, is supported on the wheel axle 16 in two bearing points by means of the two axial thrust ball bearings 9 and 17 in such a manner that the hub can be fixed to the wheel axle by means of a single bearing cone, the previous need for an adjustment of the hub in respect of the wheel fork being eliminated. This design has not only the advantage of affording a particularly convenient method of assembly, but also enables the elastic pressure means to partially or completely compensate any impacts which may act upon the gearing. In this embodiment of the transmission gear the gearing stage III is developed as in the embodiment shown in Fig. 4, the gearing parts of the gear stage III being pressed against each other by the armature and the magnet of the dynamo.

It may be mentioned that the principle on which this gearing is designed is in no way limited as regards the number of gearing stages.

Figure 6:
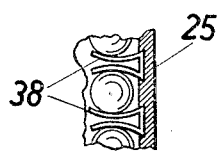
Figs. 6 and 7 show two designs for damping the wheel impact on the gearing.
Figure 7:
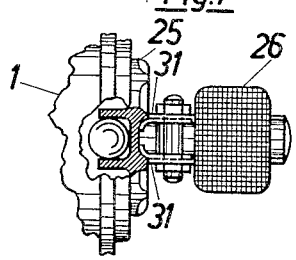

In order to prevent the transmission of impacts of circumferential direction from the wheel to the transmission gearing, the lockable cage ring 25 may, as shown in Fig. 6, hold the balls by means of elastically flexible tongues 38 or the ring may be held, as shown in Fig. 7, by means of a control lever 26 which is to some extent elastically flexible in the direction of its switching movement. Owing to the flexibility provided in the direction in which the balls rotate, both designs afford a certain play by which any impacts coming from the wheel are compensated.

What I claim is:

1. A bicycle hub dynamo provided with a multistage transmission gearing consisting of axial thrust ball bearings arranged between the dynamo armature and the driving part, and adapted to be selectively thrown in and out, comprising: pressure means for exercising axial pressure in opposite directions upon the races and balls of two adjacent gear stages, and an axial thrust bearing for holding said two gear stages together against the pressure exercised upon them by said pressure means.

2. A bicycle hub dynamo as set forth in claim 1, in which said pressure means consist of an electic e'ement inserted between two races of two adjacent gear stages and in which the other two races of said gear stages are axially undisplaceably connected.

3. A bicycle hub dynamo as set forth in claim 1, having a stator provided with a winding, and a magnetic rotor, said stator and rotor being connected each with a ball race of at least one gear stage and holding together the gear parts revolving between said races.

4. A bicycle hub dynamo as set forth in claim 1, comprising centrifugal weights for varying the axial pressure exercised by said pressure means.

5. A bicycle hub dynamo as set forth in claim 1, in which one of the outer races subjected to the pressure of said pressure means is a frictional fit in the wheel hub and adapted to remain in its position relative to the hub during the transmission of a normal torque and to rotate relative to the hub when the torque to be transmitted is excessive.

6. A bicycle hub dynamo as set forth in claim 1, comprising a single bearing cone for holding together the gear stages subjected to the pressure of said pressure means, said cone being adapted to support the whole system comprising the gearing and the wheel hub freely rotatable on the wheel axle, said system being secured against axial displacement.

7. A bicycle hub dynamo as set forth in claim 11, comprising an axial thrust ball bearing for each of the gear stages and subjected to the pressure of said pressure means, a single bearing cone for said two gear stages, said gear stages being supported and thrust in opposite axial directions against said bearing cone through said axial thrust ball bearings.

8. A bicycle hub dynamo as set forth in claim 12, in which the ball cage of said preliminary gear stage has recesses arranged in a circle, and which comprises a switching means fixed to the wheel axle and selectively insertable into said recesses for locking said cage against rotation.

9. A bicycle hub dynamo as set forth in claim 12, comprising elastically flexible tongues attached to the ball cage of said preliminary gear stage, said tongues being in engagement with the balls of said preliminary gear stage.

10. A bicycle hub dynamo as set forth in claim 12, comprising a somewhat resilient bolt for locking the ball cage of said preliminary gear stage against rotation.

11. A bicycle hub dynamo provided with a multi-stage transmission gearing consisting of axial thrust ball bearings arranged between the dynamo armature and the driving part and adapted to be selectively thrown in and out, comprising pressure means for exercising axial pressure in opposite directions upon the races and balls of two adjacent gear stages, an axial thrust bearing for holding said two gear stages together against the pressure exercised upon them by said pressure means, a stator provided with a winding, a magnetic rotor, said stator and rotor being connected each with a ball race of at least one gear stage and holding together the gear parts revolving between said races, and a separate rotor bearing arranged inside the stator.

12. A bicycle hub dynamo provided with a multi-stage transmission gearing consisting of axial thrust ball bearings arranged between the dynamo armature and the driving part, and adapted to be selectively thrown in and out, comprising pressure means for exercising axial pressure in opposite directions upon the races and balls of two adjacent gear stages, an axial thrust bearing for holding said two gear stages together against the pressure exercised upon them by said pressure means, a gear stage preliminary to the two gear stages subjected to the pressure of said pressure means, said preliminary gear stage having an outer race fitted in the wheel hub and an inner race formed as a ball cage for engaging with the balls of the gear stage adjacent to said preliminary stage, a ball cage for the ball train of said preliminary stage, and means for locking said latter ball cage against rotation.

13. A bicycle hub dynamo provided with a multi-stage transmission gearing consisting of axial thrust ball bearings arranged between the dynamo armature and the driving part, and adapted to be selectively thrown in and out, comprising pressure means for exercising axial pressure in opposite directions upon the races and balls of two adjacent gear stages, an axial thrust bearing for holding said two gear stages together against the pressure exercised upon them by said pressure means, a stator provided with a winding, a magnetic rotor, said stator and rotor being connected each with a ball race of at least one gear stage and holding together the gearing parts revolving between said races, an electrically insulated axial thrust ball bearing supporting the dynamo stator and the wheel hub, said bearing comprising an inner race fixed to the wheel axle and developed as a current collector, and an outer race connected with the wire end of the armature winding.

ALFRED RABL.

REFERENCES CITED

The following references are of record in the file of this patent:

UNITED STATES PATENTS

| Number | Name | Date |
|---|---|---|
| 2,099,972 | Dalen | Nov. 23, 1937 |
| 2,322,969 | Rabl | June 29, 1943 |